(12) United States Patent
Gosselin

(10) Patent No.: US 6,879,054 B2
(45) Date of Patent: Apr. 12, 2005

(54) PROCESS, APPARATUS, MEDIA AND SIGNALS FOR CONTROLLING OPERATING CONDITIONS OF A HYBRID ELECTRIC VEHICLE TO OPTIMIZE OPERATING CHARACTERISTICS OF THE VEHICLE

(75) Inventor: Robert Michael Gosselin, Vancouver (CA)

(73) Assignee: Azure Dynamics Inc., Vancouver (CA)

( * ) Notice: Subject to any disclaimer, the term of this patent is extended or adjusted under 35 U.S.C. 154(b) by 68 days.

(21) Appl. No.: 10/097,297

(22) Filed: Mar. 15, 2002

(65) Prior Publication Data

US 2003/0173126 A1 Sep. 18, 2003

(51) Int. Cl.$^7$ ............................. F02N 41/06; H02P 9/04
(52) U.S. Cl. ................................................. 290/40 C
(58) Field of Search ........................... 290/40 C, 40 B, 290/40 R; 180/65.2, 65.1, 65.3, 65.4; 477/3; 1/7

(56) References Cited

U.S. PATENT DOCUMENTS

| | | | | |
|---|---|---|---|---|
| 5,264,764 A | * | 11/1993 | Kuang | 318/139 |
| 5,820,172 A | | 10/1998 | Brigham et al. | 290/40 C |
| 5,887,670 A | * | 3/1999 | Tabata et al. | 180/65.2 |
| 6,242,873 B1 | | 6/2001 | Drozdz et al. | 318/139 |
| 6,348,771 B1 | * | 2/2002 | Morimoto et al. | 318/139 |
| 6,492,741 B1 | * | 12/2002 | Morimoto et al. | 290/40 C |
| 6,593,713 B2 | * | 7/2003 | Morimoto et al. | 318/139 |
| 6,624,529 B2 | * | 9/2003 | Obayashi | 290/40 C |
| 2001/0017227 A1 | | 8/2001 | Amano et al. | 180/65.2 |
| 2001/0039230 A1 | | 11/2001 | Severinsky et al. | 477/3 |
| 2002/0113441 A1 | * | 8/2002 | Obayashi | 290/40 C |
| 2004/0015255 A1 | * | 1/2004 | Davis | 700/97 |

FOREIGN PATENT DOCUMENTS

EP   1 142 749 A2   10/2001   ........... B60L/11/12

OTHER PUBLICATIONS

Galdi, V., L. Ippolito, A. Piccolo, A. Vaccaro; Multiobjective Optimization for Fuel Economy and Emissions of HEV using the Goal–Attainment Method; EVS 18; 2001.

* cited by examiner

Primary Examiner—Joe Waks
Assistant Examiner—Julio Gonzalez R.

(57) ABSTRACT

Process, apparatus, media and signals are disclosed for controlling a supply of power from an electric generator in a hybrid electric vehicle having a prime mover supplying mechanical energy to the generator. The process carried out by the apparatus and defined by codes on the media and in codes in the signals involves locating, from among a plurality of sets of vehicle operating conditions associated with a requested generator power value, an optimal set of operating conditions that optimizes operating characteristics of the vehicle and producing signals for controlling the prime mover and the generator to operate the vehicle at the optimal set of operating conditions, to supply power at the requested generator power value. The present invention also provides a way of producing vehicle performance records for use in producing signals for controlling the prime mover and the generator to achieve the optimized operating characteristics.

41 Claims, 6 Drawing Sheets

PROCESS, APPARATUS, MEDIA AND SIGNALS FOR CONTROLLING OPERATING CONDITIONS OF A HYBRID ELECTRIC VEHICLE TO OPTIMIZE OPERATING CHARACTERISTICS OF THE VEHICLE

BACKGROUND OF THE INVENTION

1. Field of Invention

This invention relates to the control of hybrid electric vehicles and more particularly to processes, apparatus, media and signals for controlling operating conditions of a hybrid electric vehicle to optimize operating characteristics thereof.

2. Description of Related Art

Generally all hybrid electric vehicles have energy management controllers that control the supply and use of electrical energy in the vehicle. Such controllers normally provide signals to control the speed of a prime mover of the vehicle and to control the amount of energy demanded from a generator driven by the prime mover.

The production of these signals however, tends to be based on instant energy demands on the electrical system of the vehicle. Thus, when a certain supply of electrical energy is required, demand on the generator is increased while the current speed of the prime mover is usually held constant. This can result in inefficient operation of the vehicle, because at certain speeds, a vehicle may emit more pollutants, be less comfortable to drive and may have high fuel consumption, for example. In other words, the operating characteristics of the vehicle may not be optimized. The present invention addresses this problem.

SUMMARY OF THE INVENTION

In accordance with one aspect of the invention, there is provided a process for controlling operating conditions of a hybrid electric vehicle to optimize operating characteristics of the vehicle. The process involves locating, from among a plurality of sets of vehicle operating conditions associated with a requested generator power value, an optimal set of operating conditions that optimizes operating characteristics of the vehicle. The process further involves producing signals for controlling a primer mover of the vehicle and a generator driven by the prime mover to operate the vehicle at the optimal set of operating conditions to supply power at the requested generator power value.

Locating may involve finding an optimal set of operating characteristics, associated with operating conditions associated with the requested power value, that provides a minimal value, in a function of the operating characteristics, that is less than values produced by other sets of operating characteristics associated with other operating conditions associated with the requested power value.

Locating may involve subjecting the operating characteristics of a plurality of different operating conditions associated with the requested power value to the function. Subjecting may involve subjecting the operating characteristics to a weighted function and the process may involve selecting weights used in the function according to operating mode of the vehicle.

Producing signals for controlling the prime mover and the generator may involve producing the signals in response to a set of operating conditions associated with the optimal set of operating characteristics.

Locating may involve locating a set of vehicle operating characteristics associated with the requested generator power value and this may involve locating a vehicle performance record having a field containing the requested generator power value and fields containing values identifying operating conditions under which the requested generator power can be produced and fields containing values identifying operating characteristics of the vehicle when the vehicle is operated at the operating conditions.

Locating may also involve calculating an optimization index for each set of vehicle operating characteristics associated with the requested generator power value and calculating an optimization index may involve calculating a cost value as a function of a weighted sum of normalized operating characteristic values. Weights for use in calculating the weighted sum may be selected in response to an operating mode of the vehicle.

Locating may also involve identifying the best optimization index and this may involve finding the optimization index with the lowest number. Locating may further involve identifying a set of operating conditions associated with vehicle operating characteristics that produced the best optimization index.

Producing signals for controlling the prime mover and the generator may involve producing a speed signal for setting an angular speed of the prime mover and producing a torque signal for setting a torque burden on the generator.

In accordance with another aspect of the invention, there is provided an apparatus for controlling operating conditions of a hybrid electric vehicle to optimize operating characteristics of the vehicle. The apparatus includes a power request processor operable to locate, from among a plurality of sets of vehicle operating conditions associated with a requested generator power value, an optimal set of operating conditions that optimizes operating characteristics of the vehicle. The apparatus further includes a control signal generator operable to produce signals for controlling a primer mover of the vehicle and a generator driven by the prime mover to operate the vehicle at the optimal set of operating conditions to supply power at the requested generator power value.

The apparatus may further include a locator operable to locate an optimal set of operating characteristics, associated with operating conditions associated with the requested power value, that provides a minimal value in a function of the operating characteristics, that is less than values produced by other sets of operating characteristics associated with other operating conditions associated with the requested power value.

The apparatus may further include a device operable to subject the operating characteristics associated with a plurality of different operating conditions associated with the requested power value to the function. The function may be a weighted function and the apparatus may further include a selector operable to select weights used in the function according to the operating mode of the vehicle.

The control signal generator may be operable to produce signals in response to a set of operating conditions associated with the optimal set of operating characteristics.

The request processor may be implemented in a processor circuit.

The apparatus may include a locator operable to locate a set of vehicle operating characteristics associated with the requested generator power value. The locator may be implemented in a processor circuit and may be operable to locate a vehicle performance record having a field containing the requested generator power value and having fields containing values identifying operating conditions under which the requested generator power can be produced and having fields containing values identifying operating characteristics of the vehicle when the vehicle is operated at the operating conditions.

The apparatus may further include a computation device operable to calculate an optimization index for each set of vehicle operating characteristics associated with the requested generator power value. The computation device may be implemented in a processor circuit and may be operable to calculate a cost value as a function of a weighted sum of normalized operating characteristic values. The apparatus may further include a selector operable to select weights for use in calculating the weighted sum, in response to an operating mode of the vehicle. The selector may be implemented in a processor circuit.

The apparatus may further include an identifier operable to identify the best optimization index. The identifier may also be implemented in a processor circuit and may be operable to find the optimization index with the lowest number. The apparatus may further include a device operable to identify a set of operating conditions associated with the vehicle operating characteristics that produced the best optimization index.

The control signal generator may be operable to produce a speed signal for setting an angular speed of the prime mover and to produce a torque signal for setting a torque burden on the generator in response to the set of operating conditions associated with the vehicle operating characteristics that produced the best optimization index. The control signal generator may be implemented in a processor circuit.

The apparatus may further include a database interface facilitating communication between the request processor and a database storing the sets of vehicle operating conditions.

In accordance with another aspect of the invention, there is provided an apparatus for controlling operating conditions of a hybrid electric vehicle to optimize operating characteristics of the vehicle. The apparatus includes means for locating, from among a plurality of sets of vehicle operating conditions associated with a requested generator power value, an optimal set of operating conditions that optimizes operating characteristics of the vehicle and means for producing signals for controlling a primer mover of the vehicle and a generator driven by the prime mover to operate the vehicle at the optimal set of operating conditions to supply power at the requested generator power value.

In accordance with another aspect of the invention, there is provided a computer readable medium for providing instructions that cause a processor circuit to control operating conditions of a hybrid electric vehicle to optimize operating characteristics of the vehicle. The instructions comprise codes for directing the processor circuit to locate, from among a plurality of sets of vehicle operating conditions associated with a requested generator power value, an optimal set of operating conditions that optimizes the operating characteristics of the vehicle and codes for directing the processor circuit to produce signals for controlling a primer mover of the vehicle and a generator driven by the prime mover to operate the vehicle at the optimal set of operating conditions to supply power at the requested generator power value.

In accordance with another aspect of the invention, there is provided a computer data signal for providing instructions that cause a processor circuit to control operating conditions of a hybrid electric vehicle to optimize operating characteristics of the vehicle. The signal comprises a code segment operable to direct the processor circuit to locate, from among a plurality of sets of vehicle operating conditions associated with a requested generator power value, an optimal set of operating conditions that optimizes the operating characteristics of the vehicle and a code segment operable to direct the processor circuit to produce signals for controlling a primer mover of the vehicle and a generator driven by the prime mover to operate the vehicle at the optimal set of operating conditions to supply power at the requested generator power value.

In accordance with another aspect of the invention, there is provided a method of producing a record for use in controlling a supply of power from an electric generator powered by a prime mover in a hybrid electric vehicle. The method involves associating a set of operating characteristics of the vehicle known to occur when the vehicle is operated under certain operating conditions, with respective power values approximately equal to the actual power produced by the generator when the generator is operated under operating conditions approximately equal to said certain operating conditions.

Associating may involve quantizing to a pre-defined resolution a plurality of actual generator output power values associated with respective sets of operating conditions to produce a plurality of quantized generator output power values. It may also involve grouping the sets of operating conditions according to respective corresponding quantized generator output power values.

Associating may also involve, for each set of operating conditions associated with a quantized generator output power value finding a set of operating characteristic values closest to a set of operating conditions associated with a quantized generator output power value.

Finding a set of operating characteristic values may involve interpolating the set of operating characteristic values from a set of operating characteristic values associated with the certain operating conditions.

Associating may further involve normalizing an interpolated set of operating characteristic values to produce a set of normalized operating characteristic values and may further involve associating the set of normalized operating characteristic values with operating conditions associated with a quantized generator output power value.

In accordance with another aspect of the invention, there is provided an apparatus for producing a record for use in controlling a supply of power from an electric generator powered by a prime mover of a hybrid electric vehicle. The apparatus includes a processor circuit configured to associate a set of operating characteristics of the vehicle known to occur when the vehicle is operated under certain operating conditions, with respective power values approximately equal to the actual power produced by the generator when the generator is operated under operating conditions approximately equal to said certain operating conditions.

The processor circuit may be configured to quantize to a pre-defined power resolution a plurality of actual generator output power values associated with respective sets of operating conditions to produce a plurality of quantized generator output power values and may be configured to group the sets of operating conditions according to respective corresponding quantized generator output power values.

The processor circuit may also be configured to, for each set of operating conditions associated with a quantized generator output power value, find a set of operating characteristic values closest to each set of operating conditions.

The processor circuit may also be configured to interpolate the set of operating characteristic values from a set of operating characteristic values associated with the certain operating conditions and to normalize the interpolated set of operating characteristic values to produce a set of normalized operating characteristic values.

The processor circuit may also be configured to associate the set of normalized operating characteristic values with operating conditions associated with a quantized generator output power value.

In accordance with another aspect of the invention, there is provided a computer readable medium operable to provide codes for directing a processor circuit to control a supply of power from an electric generator powered by a prime mover in a hybrid electric vehicle, by associating a set of operating characteristics of the vehicle known to occur when the vehicle is operated under certain operating conditions, with respective power values approximately equal to the actual power produced by the generator when the generator is operated under operating conditions approximately equal to said certain operating conditions.

In accordance with another aspect of the invention, there is provided a data signal operable to provide codes for directing a processor circuit to control a supply of power from an electric generator powered by a prime mover in a hybrid electric vehicle. The data signal comprises a signal segment providing codes for directing a processor circuit to associate a set of operating characteristics of the vehicle known to occur when the vehicle is operated under certain operating conditions, with respective power values approximately equal to the actual power produced by the generator when the generator is operated under operating conditions approximately equal to said certain operating conditions.

In accordance with another aspect of the invention, there is provided a database structure for storing records for use in controlling the operation of a hybrid electric vehicle having an electric generator driven by a prime mover of the electric vehicle. The database structure has means for storing a given generator output power value and means for associating a set of operating characteristics of the vehicle known to occur when the vehicle is operated under certain operating conditions, with respective power values approximately equal to the actual power produced by the generator when the generator is operated under operating conditions approximately equal to said certain operating conditions.

The present invention can be used to cause a hybrid electric vehicle to be operated under conditions that optimize operating characteristics of the vehicle, such as fuel economy, environmental emissions and driveability and/or comfort. Effectively, operating characteristics such as these are considered in determining operating conditions of the vehicle, namely the speed of the prime mover and the torque load applied to the generator such that operating characteristics of the vehicle are optimized. Different considerations can be given to different operating characteristics depending upon the mode of operating the vehicle, such as cold start or engine warm.

The present invention also provides a way of producing vehicle performance records for use in producing signals for controlling the vehicle to achieve the optimized operating characteristics.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
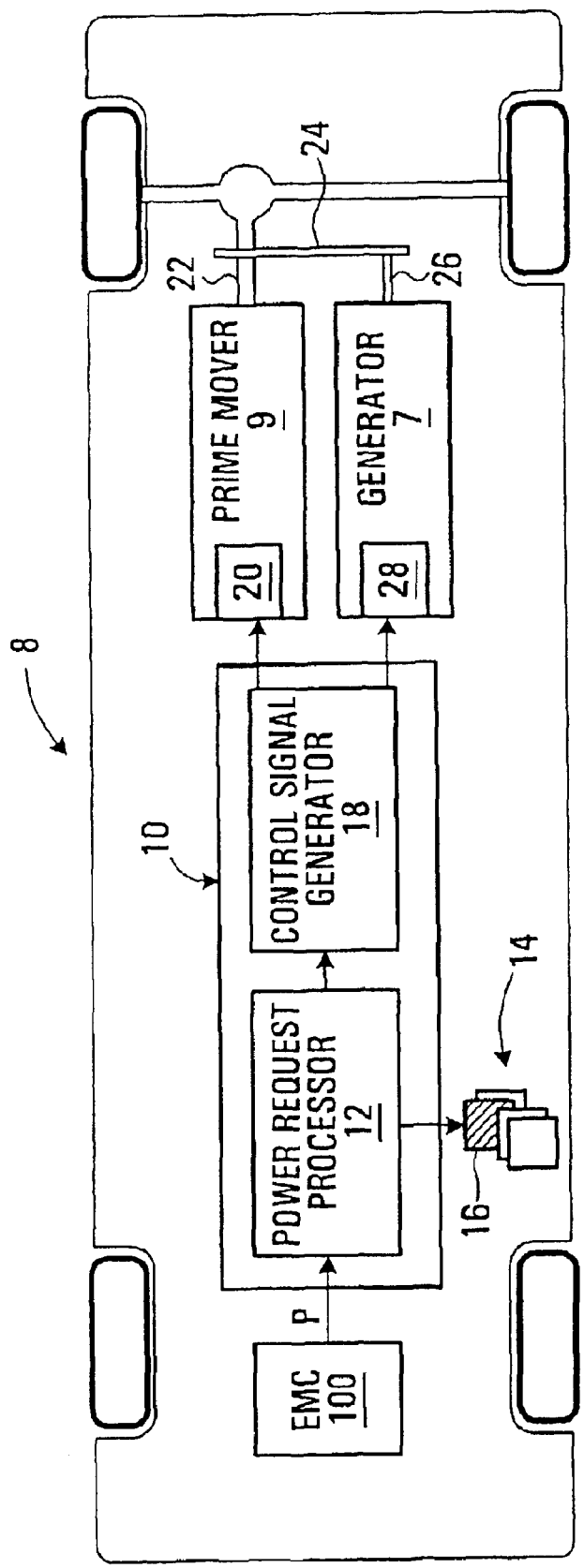
FIG. 1 is a schematic representation of a hybrid electric vehicle containing an apparatus according to a first embodiment of the invention.

Referring to FIG. 1, an apparatus for controlling operating conditions of a hybrid electric vehicle 8 to optimize operating characteristics of the vehicle is shown generally at 10. The apparatus comprises a power request processor 12 operable to locate, from among a plurality of sets 14 of vehicle operating conditions associated with a requested generator power value P, an optimal set 16 of operating conditions that optimizes the operation of the vehicle 8. The apparatus 10 further includes a control signal generator 18 operable to produce signals for controlling a prime mover 9 of the vehicle and a generator 7 driven by the prime mover to operate the vehicle 8 at the optimal set 16 of operating conditions, to supply electric power at the requested generator power value P. The electric power produced by the generator 7 may be fed to a power bus (not shown) operable to supply power to various electrical components of the hybrid electric vehicle such as storage batteries and electrical accessories, for example.

The prime mover 9 may be an internal combustion engine such as a gasoline or diesel powered engine, for example. It will be appreciated that in the art of hybrid electric vehicles, such a prime mover 9 has a controller 20 operable to receive a speed control signal indicating a desired engine shaft speed. A shaft 22 of the prime mover 9 is in mechanical communication such as by a direct drive through a shaft or gearbox 24, for example, with a shaft 26 of the generator 7 to permit the prime mover to impart mechanical energy to the generator. The generator 7 is operable to receive signals representing a torque load or burden to be placed on the generator to deliver energy to the power bus at a rate determined as a function of the generator shaft 26 speed and torque load. Typically, this torque load is varied by changing the amount of current supplied to a field (not shown) of the generator 7. The generator 7 has a generator interface 28 that controls the field strength to adjust the torque load on the generator in response to a torque control signal received from a control device. In the embodiment shown, the control device is the apparatus 10. The apparatus 10 produces a speed control signal for use by the controller 20 of the prime mover 9 for controlling the speed of the shaft 22 prime mover 9 and hence controls the speed of the shaft 26 of the generator 7 as a result of the transfer of mechanical energy through the shaft or gearbox 24. The apparatus 10 also produces a torque control signal for receipt by the generator interface 28 for controlling the torque load on the generator 7 to cause energy to be supplied to the power bus of the vehicle 8 at a rate that optimizes operating characteristics of the vehicle. The speed of the shaft 22 of the prime mover 9 and the torque burden on the generator 7 represent a set of operating conditions under which the vehicle is operated.

In the embodiments described herein optimization of the operating characteristics of the hybrid electric vehicle 8 occurs when operating conditions are set such that a cost function providing a measure of tradeoffs between operating characteristics of the vehicle such as fuel consumption, pollutant emissions, battery life, generator efficiency and driveability (such as minimal noise and harshness due to generator burden) is minimized. In other words, an optimal set of operating conditions is established by the apparatus 10 to provide the best operating characteristics of the vehicle 8, thereby optimizing the operation of the vehicle.

In order to use the apparatus 10, the apparatus must include or have access to a plurality of sets 14 of vehicle operating conditions and associated measures of operating characteristics for various possible requested power values. These operating conditions, operating characteristics and requested power values may be pre-established through empirical measurements taken on a representative vehicle, for example.

Figure 2:
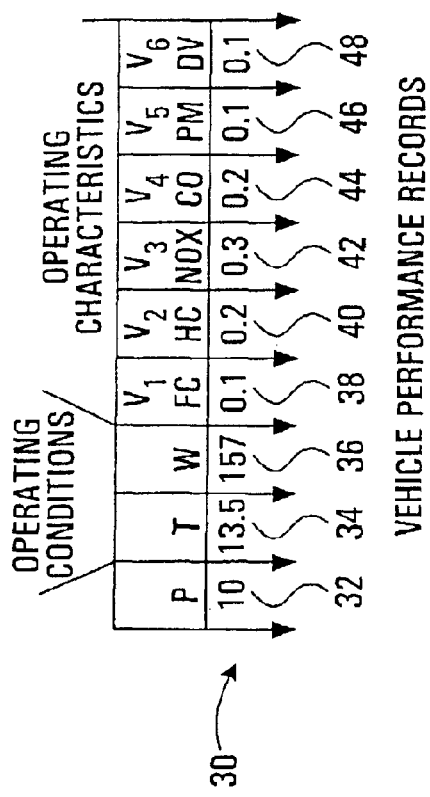
FIG. 2 is a tabular representation of a vehicle performance record produced in accordance with a method according to one aspect of the invention.

Referring to FIG. 2, in this embodiment, the plurality of sets 14 of vehicle operating conditions are stored in vehicle performance records, one of which is shown at 30 in FIG. 2. Each vehicle performance record 30 has a power field 32, operating conditions fields including a torque field 34 and an angular speed field ($\omega$) 36, and a plurality of operating characteristic fields, which, in this embodiment, include a fuel consumption field 38, a hydrocarbon emission field 40, a nitrous oxide emission field 42, a carbon monoxide emission field 44, a particulate matter emission field 46 and a driveability field 48. The vehicle performance record 30 defines a database structure and serves to associate each of the indicated fields with each other. The power field 32 is used to store a value representing a possible requested power value, such as 10 kilowatts, for example. The torque field 34 is used to store a value representing a specific torque burden on the generator 7 such as 100 Nm, for example, produced by electric current produced by the generator to meet the requested power demand. The angular speed field 36 is used to store a value representing an angular speed w in radians per second, for example, of the shaft 22 of the prime mover 9. The torque and angular speed fields 34 and 36 hold values representing a set of operating conditions of the vehicle 8, the set of operating conditions being the number pair comprising the value representing the torque burden and the angular speed value stored in the torque and angular speed fields 34 and 36, respectively.

The fuel consumption field 38 is used to hold a value representing the fuel consumption of the prime mover 9, in liters per hour, for example, when the generator 7 and prime mover 9 are operated at the operating conditions specified by the contents of the torque field 34 and the angular speed field 36. The hydrocarbon emission field 40, nitrous oxide emission field 42, carbon monoxide emission field 44, and particulate matter emission field 46 are used to hold values representing the amount of hydrocarbons, nitrous oxide, carbon monoxide and particulate matter, respectively, in parts per million, for example, emitted when the prime mover 9 is operated at the associated operating conditions. The driveability field 48 is used to hold a value representing a measure of the comfort experienced by a driver of the vehicle 8 at the associated operating conditions.

To produce records of the type shown in FIG. 2, empirical measurements of operating characteristic values may be made while operating the vehicle 8 at various sets of operating conditions. For example, the prime mover 9 in the hybrid electric vehicle 8 may be a Volkswagen gas-powered engine and the generator may be an SR-218 generator, manufactured by Unique Mobility Inc. of Golden, Colo., U.S.A. The range of angular speed settings of the prime mover shaft 22 at which operating characteristic values are measured may be from about 150 radians per second to about 500 radians per second while the range of torque burden for each angular speed setting may range from about 13 Nm to about 150 Nm. The resolution of operating condition values is preferably kept to as fine a resolution as possible which may be perhaps one-tenth of a radian per second and one-tenth of a Nm, for example.

In addition to measuring emission levels of certain gases and particulate matter, a driveability value may be determined by subjective judgement provided by a test operator, for example, and this value may be stored in the driveability field 48. Noise measurements may be considered in making this subjective judgement, for example, or noise measurement values may act as another operating characteristic of the vehicle, for example.

It will be appreciated that, in general, a wide variety of operating characteristics including, or instead of, the operating characteristics described herein may be included in a set of operating characteristics of the vehicle. In general any quantifiable operating characteristic may be included in the set of operating characteristics associated with a given set of operating conditions.

In general, the operating condition number pairs and respective sets of operating characteristic values measured at such operating condition number pairs may be initially stored in raw data records having a tabular arrangement similar to that shown in FIG. 2, without the power field 32, for example. To associate the power field 32 with the operating condition number pairs and their associated sets of operating characteristics, it is necessary to establish the relationship between generator torque load, generator shaft speed and actual generator power output. This takes into account any losses in the generator. This may be provided by the manufacturer of the generator but may alternatively be established by empirical measurements. In effect, a plurality of three-tuples is produced or acquired or made available, where each three tuple comprises a generator output power value, a generator torque value, and a generator shaft speed value (P, T, $\omega_G$). The generator shaft speed value is then preferably converted to a prime mover shaft speed value using the drive ratio of the shaft or gearbox 24 and the prime mover shaft speed value is substituted for the generator shaft speed value in the three tuple (P, T, $\omega_P$). These three tuples are subsequently referred to herein as generator three-tuples.

It will be appreciated that the operating condition values at which the operating characteristics are measured may not be the same operating condition values for which generator output power values are provided. Consequently, it is necessary to adjust the measured operating characteristic values to reflect more appropriate values that would be expected if the measurements of the operating characteristics had been taken at the same operating conditions for which the generator output power values are provided.

Given the raw data records and a plurality of three tuples of the type described above, records having a format similar to that shown in FIG. 2 may be produced by associating sets of raw operating characteristics of the vehicle known to occur when the vehicle is operated under certain operating conditions with respective power values approximately equal to the actual power produced by the generator when the generator is operated under a set of operating conditions approximately equal to said certain operating conditions.

Figure 3:
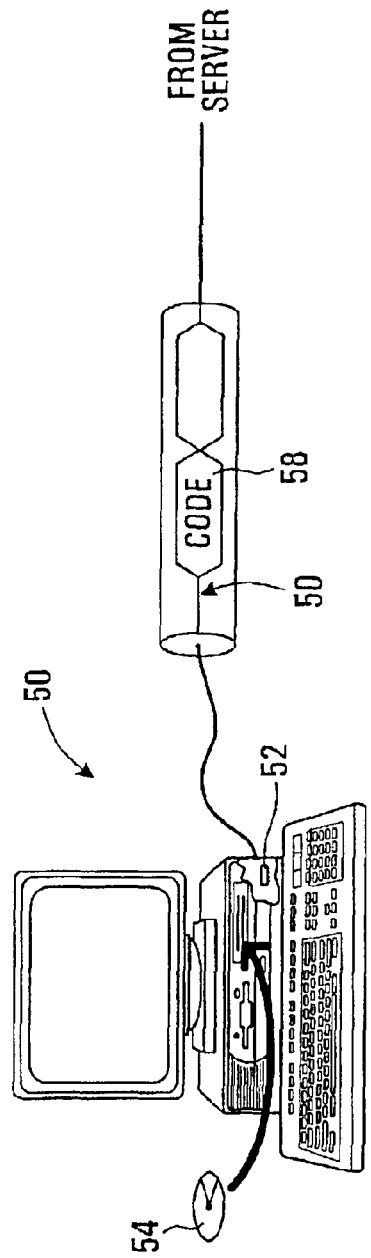
FIG. 3 is a schematic diagram of a computer used to produce vehicle performance records of the type shown in FIG. 2.

Referring to FIG. 3, this association may be performed by a computer, such as a personal computer 50 comprising a processor circuit 52 suitably programmed with codes representing instructions that direct the processor circuit 52 to perform the tasks described herein. The computer 50 may be on board the vehicle 8 or remote from the vehicle. The codes may be provided by a computer readable medium such as a CD-ROM 54 for example, or may be provided in a computer data signal 56 received from a source such as an external source such as a server accessible through the internet for example. The computer data signal 56 may comprise a code segment 58 having modulation representing the codes, for example.

In this embodiment, the codes direct the processor circuit 52 to associate a set of operating characteristics of the vehicle known to occur when the vehicle is operated under certain operating conditions, with respective power values approximately equal to the actual power produced by the generator when the generator is operated under operating conditions approximately equal to said certain operating conditions.

Figure 4:
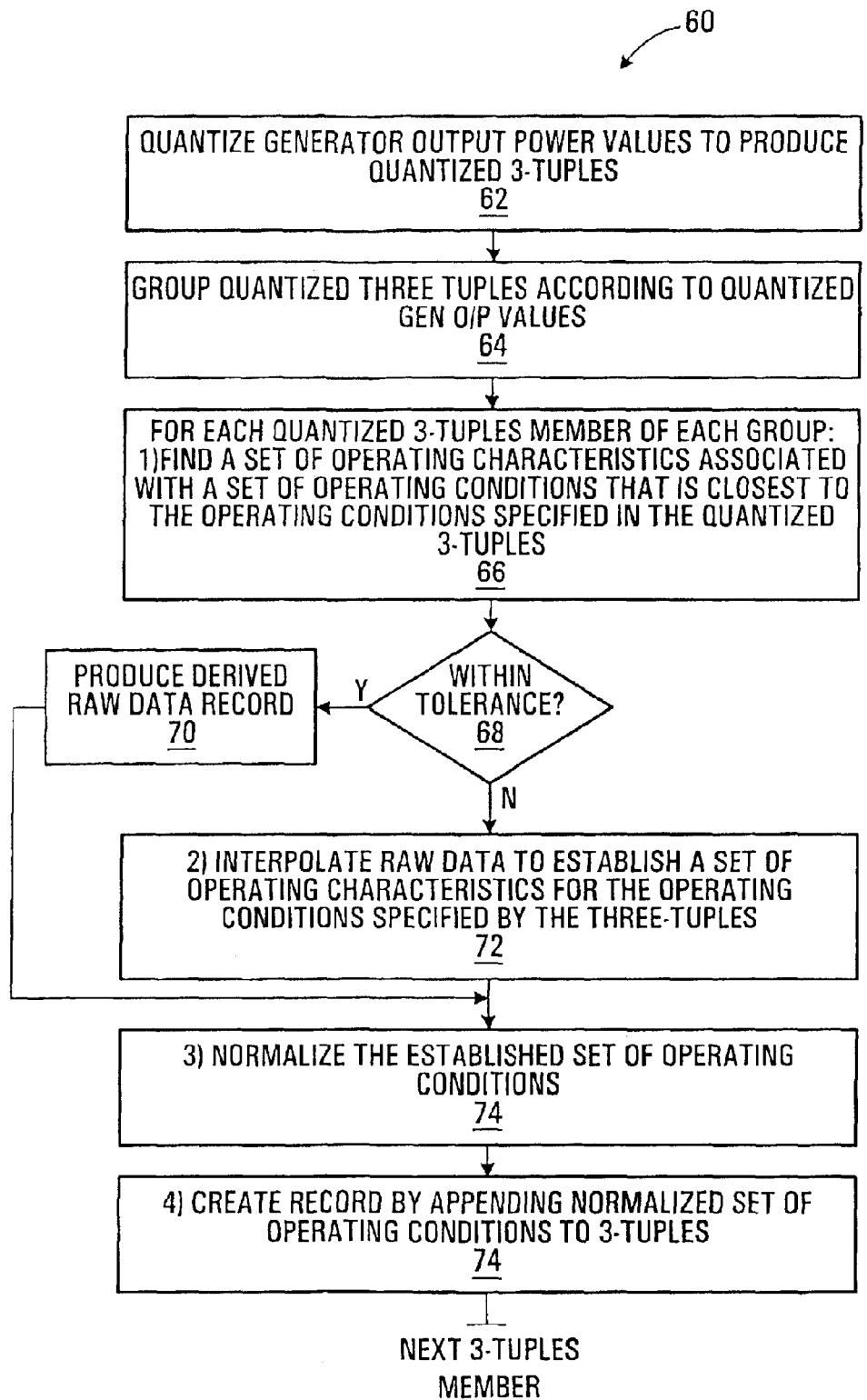
FIG. 4 is a flowchart of a vehicle performance record production routine executed by the computer shown in FIG. 3.

Referring to FIG. 4, in this embodiment, the processor circuit 52 of FIG. 3 performs the function of associating by executing a vehicle performance record production routine shown generally at 60. It is assumed the processor circuit 52 is provided with or has access to the plurality of generator three tuples (P, T, $\omega_P$) representing generator output power, generator shaft torque and prime mover shaft speed, and has access to raw data records having a format similar to that shown in FIG. 2, without the power field 32.

To effect the vehicle performance record production routine 60, the codes directing the processor circuit 52 to perform the function of associating include a first block 62 that directs the processor circuit 52 to quantize the actual generator output power values of each of the generator three tuples, according to a pre-defined resolution. For example, the generator output power values may be quantized into increments of 1 kW. Thus, for example, in any generator three tuple having a generator output power raw value of 10.4 kW, the generator output power value would be adjusted to a quantized value of 10 kW. Similarly, any generator three tuple having a generator output raw value of 10.5 kW would have its generator output power value adjusted to a quantized value of 11 kW. The remaining values of the three-tuple, that is, the torque and angular speed values of each three tuple could remain unchanged or could be adjusted by interpolation to values that would have produced the corresponding quantized power value. Thus, the generator three tuples are modified, in that at least the generator output power values thereof are quantized. Three tuples having quantized generator output power values are hereafter referred to as quantized three tuples ($P_Q$, T, $\omega_P$).

Next, block 64 directs the processor circuit 52 to group the quantized three tuples according to their quantized generator output power values ($P_Q$). Thus all quantized three tuples having a generator output value of 10 kW, for example, will be grouped together. This may be done by sorting the three tuples by their quantized generator output power values.

Block 66 then directs the processor circuit 52 to address each quantized three tuple in each group and for each quantized three tuple look in the raw data records to find a set of operating characteristics associated with a set of operating conditions that is closest to the set of operating conditions specified in the quantized three tuple.

Block 68 directs the processor circuit 52 to determine whether each value in the operating conditions of the closest raw data record is within a pre-defined tolerance of the operating conditions specified by the quantized three tuple, and if so to cause block 70 to cause the processor circuit 52 to produce a derived raw data record having the same fields as shown in the record 30 shown in FIG. 2, where the elements of the quantized three tuple ($P_Q$, T, $\omega_P$) are stored in the power, torque and angular speed fields 32, 34 and 36 respectively, and the raw values from the derived raw data record stored are in corresponding operating characteristic fields 38, 40, 42, 44, 46 and 48 respectively.

If at block 68 the operating conditions in the closest raw data record are not within the pre-defined tolerance of the operating conditions specified by the quantized three tuple, block 72 directs the processor circuit 52 to interpolate the raw operating characteristic data, to establish a set of interpolated operating characteristics corresponding to the actual operating conditions specified by the T and $\omega_P$ components of the quantized three tuple ($P_Q$, T, $\omega_P$). This is effectively a two dimensional linear interpolation to obtain a set of most probable operating characteristic values between two other measured operating characteristic values at relatively near operating conditions. This interpolated set of operating characteristic values and the operating conditions of the three tuple may be associated with each other by storing them in a derived raw data record having the same fields as shown in the vehicle performance record 30 shown in FIG. 2, where the elements of the quantized three tuple under consideration are stored in the power, torque and angular speed fields 32, 34 and 36 respectively, and the interpolated raw operating characteristic values are stored in corresponding operating characteristic fields 38, 40, 42, 44, 46 and 48 respectively.

Effectively, blocks 66, 68, 70 and 72 cause the processor circuit to find a set of operating characteristic values closest to a set of operating conditions associated with a quantized generator output power value.

After producing a derived raw data record at block 70 or block 72, block 74 directs the processor circuit 52 to normalize the operating characteristics among each other within the record. This may be done according to the relation:

$$N = \frac{G - G\min}{G\max - G\min}$$

Where N is a normalized value which replaces a raw value G;

G is the raw value that is to be normalized;

Gmin is the minimum raw value among the set of operating characteristics; and

Gmax is the maximum raw value among the set of operating characteristics.

Block 76 then directs the processor circuit 52 to create vehicle performance records by replacing each of the operating characteristic values in each of the derived raw data records with a respective normalized value such that the sum of all normalized values in the record is one. Thus, the normalized values represent the relative contributions to the set of operating characteristics for a given power value and the set of normalized operating characteristic values is associated with operating conditions associated with a quantized generator output power value.

Blocks 66–76 are repeated for each quantized three tuple to produce a plurality of vehicle performance records of the type shown at 30 in FIG. 2. Each vehicle performance record represents a set of vehicle operating conditions associated with a possible requested generator power value and with a set of operating characteristics. This plurality of vehicle performance records may be made available to the power request processor 12 shown in FIG. 1, through a medium such as a communications medium or a computer readable medium, for example. The communications medium might include a server accessible by the power request processor 12 through an internet connection and such connection may be provided by a landline or by a wireless link. It is not necessary to provide remote access to the plurality of vehicle performance records on a continuing basis. It is sufficient to simply download into the vehicle 8 a plurality of vehicle performance records 30 that can be made available at the vehicle, to the power request processor 12 therein. It will be appreciated that the plurality of vehicle performance records may be continually updated by a manufacturer or service provider and different pluralities of vehicle performance records may be made available for different vehicle configurations, such as with or without air conditioning, for example.

In addition, raw data can be continually acquired by a data acquisition system (not shown) situated on the vehicle 8 and the data acquisition system may have the computing resources or may have access to the computing resources required to execute the vehicle performance record production routine shown in FIG. 4 to produce a plurality of vehicle performance records that can be used by the power request processor 12 shown in FIG. 1. For example, the data acquisition system may continually acquire raw emissions data and transmit this data to a server accessible via the internet, whenever a computer on the vehicle is placed in communication with the server. The server may automatically receive the acquired data and automatically operate on it to produce a new plurality of vehicle performance records. This new plurality of vehicle performance records may then be automatically communicated to the computer on the vehicle 8 during the same communication session or during a later communication session. This use of the acquired data may allow hybrid vehicle manufacturers to develop data useful in designing new vehicles and in designing improvements to existing vehicles, whereby such improvements may be reflected in changes to the plurality of vehicle performance records. It may also allow vehicle manufacturers to adjust operating conditions of existing vehicles as the vehicle ages, to prolong the life of the vehicle, for example.

Referring back to FIG. 1, it will be appreciated that the apparatus 10 is intended for use in a hybrid electric vehicle 8 having an energy management controller 100 that controls the supply, use, and storage of electrical energy in the vehicle. The use of energy management controllers is generally well known and the apparatus 10 described herein may be used with any type of energy management controller that produces a signal representing a desired power output from the generator 7. Effectively the apparatus 10 uses this signal to produce an optimum set of operating conditions, which, in this embodiment, includes signals representing a shaft speed of the prime mover 9 and signals representing a torque load on the generator 7, that optimize certain operating characteristics of the vehicle 8 which, in this embodiment, include fuel consumption, hydrocarbon emissions, nitrous oxide emissions, carbon monoxide emissions, particulate matter emissions and driveability.

Figure 5:
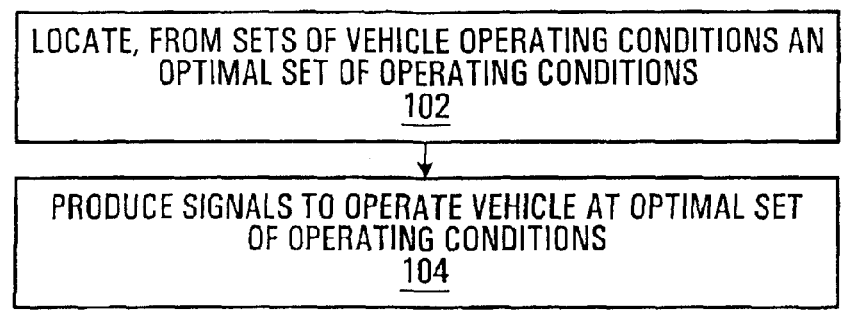
FIG. 5 is a flowchart illustrating a method according to one aspect of the invention.

Referring to FIG. 5, the apparatus 10 effectively performs two main operations. In a first operation 102 the apparatus 10 locates from among a plurality of sets of vehicle operating conditions associated with a requested generator power value, an optimal set of operating conditions that optimizes certain operating characteristics of the vehicle. In a second operation 104 the apparatus 10 produces signals for controlling the prime mover 9 and the generator 7 to operate the vehicle at the optimal set of operating conditions while causing the generator to supply power at the requested power value.

Figure 6:
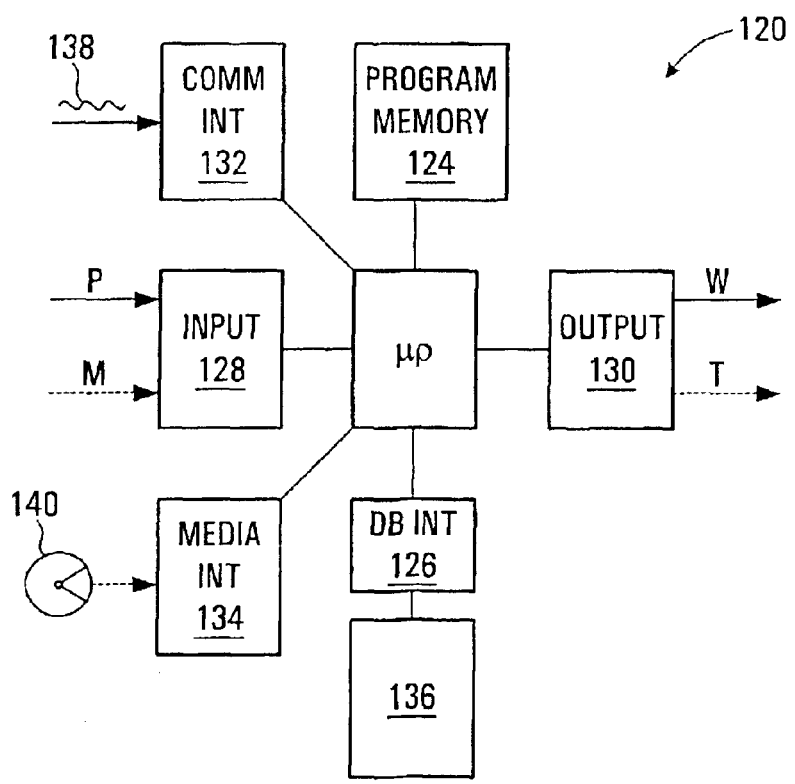
FIG. 6 is a block diagram of a processor circuit for implementing the apparatus shown in FIG. 1.

Referring to FIG. 6, to achieve the above two main operations, the apparatus 10 includes a processor circuit 120 comprising a microprocessor 122, program memory 124, a vehicle record database interface 126, an input port 128, an output port 130, a communications interface 132 and a media interface 134. The vehicle record database interface 126 facilitates the microprocessor 122 accessing a vehicle record database 136 containing a plurality of vehicle records of the type described in FIG. 2. The vehicle record database may be maintained by the microprocessor 122 itself, in which case the records may simply be stored in non-volatile memory (not shown) forming part of the processor circuit 120. Or, the vehicle record database may be stored in a separate memory (not shown) that serves as part of another processor circuit (not shown) and which is accessible to the processor circuit 120 through the vehicle record database interface 126. It is expected that the processor circuit 120, however would be a main processor circuit of the vehicle 8 and programs stored in the program memory 124 will implement routines for directing the processor circuit 120 to carry out the functions described herein. In particular, the program memory 124 is loaded with a main program that effectively causes the processor circuit 120 to act as the power request processor 12 shown in FIG. 1 and is further loaded with a control signal generator program that causes the processor circuit 120 to act as the control signal generator 18 shown in FIG. 1.

The programs stored in the program memory 124 may be received from a plurality of sources. For example, the programs may be programmed into an Electrically Programmable Read Only Memory (EPROM) that forms part of the program memory 124. Alternatively, the program memory 124 may include flash memory operable to be programmed with codes received from the communications interface 132 and/or the media interface 134. Codes representing instructions for directing the processor circuit to carry out the functionality described herein may also be provided in data signals 138 received at the communications interface 132, comprising code segments containing the relevant codes or they may be provided on a computer readable medium 140 readable by the media interface 134.

Figure 7:
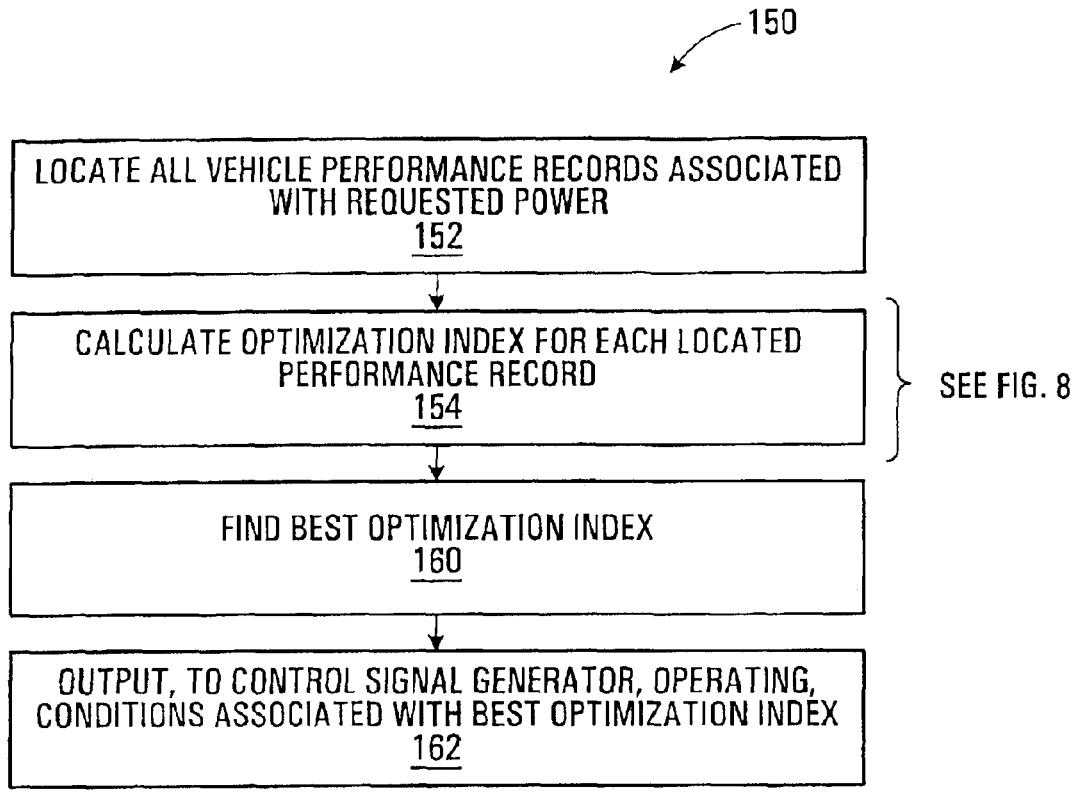
FIG. 7 is a flowchart of a main routine executed by the processor circuit shown in FIG. 6.

Referring to FIG. 7 blocks representing codes implementing a main routine are shown generally at 150. A first block 152 directs the processor circuit 120 to address the vehicle records database 136 to locate all vehicle performance records of the type shown in FIG. 2 in which the contents of the power field 32 is equal to the power requested as indicated by a power requested signal P from the energy management controller 100 of the vehicle 8 and received at the input port 128 of the processor circuit 120 shown in FIG. 6. Locating the records may involve copying records satisfying the above criteria to a temporary memory area or simply identifying addresses or pointers in the database where the contents of the located records can be found and read.

Figure 8:
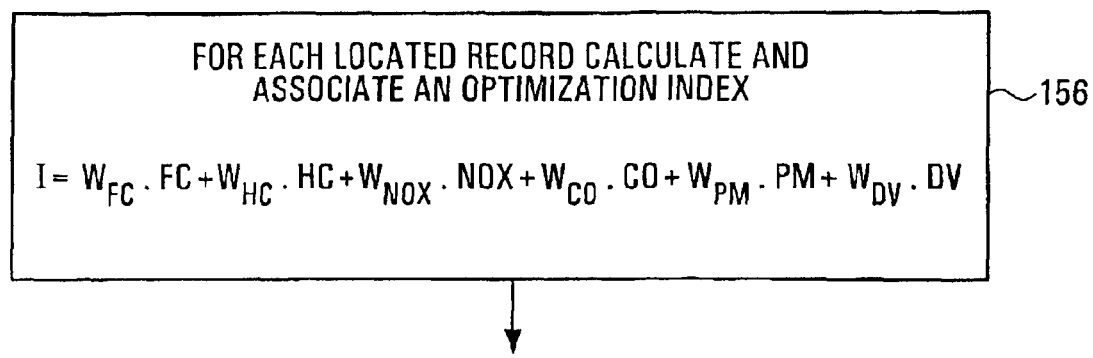
FIG. 8 is a flowchart of a block executed by the processor circuit of FIG. 6 for calculating an optimization index.

Block 154 then directs the processor circuit 120 to calculate an optimization index for each located record and associate optimization indices with respective records. Referring to FIG. 8, block 154 of FIG. 7 may be comprised of block 156 which directs the processor circuit 120 to compute the optimization index as the weighted sum of the contents of the operating characteristic fields 38–48. In this embodiment, the calculation of the optimization index may involve the calculation of a cost value as a function of a weighted sum of normalized operating characteristic values, according to the relation:

$$I = w_{fc}FC + w_{hc}HC + w_{nox}NOX + w_{co}CO + w_{pm}PM + w_{dv}DV$$

Figure 9:
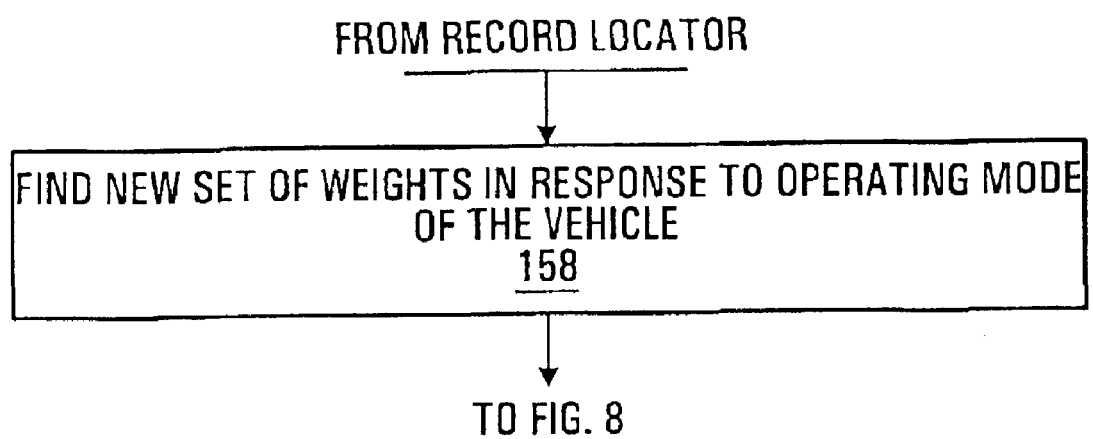
FIG. 9 is a flowchart representing a block executed by the processor circuit shown in FIG. 6 to produce a set of weights for use in the calculation of the optimization index shown in FIG. 8, in response to an operating mode of the vehicle.

This cost function effectively provides a measure of the "cost" of producing power at the requested level for a given set of operating conditions. In one embodiment, the weights $W_{fc}$, $W_{hc}$, $W_{nox}$, $W_{co}$, $W_{pm}$, $W_{dv}$ may be fixed. In another embodiment, the weights may be selected by the operating mode of the vehicle 8, for example. In such an embodiment, block 154 of FIG. 7 may further include block 158 shown in FIG. 9, in addition to and preceding block 156 of FIG. 8, which provides block 156 with a set of weights in response to receipt of a signal from the energy management controller 100 indicating an operating mode of the vehicle. Separate sets of weights may be stored in memory and accessible by the processor circuit 120 for selection depending on the vehicle operating mode, such as cold start, warm start, etc. Thus, the weights used in calculating the weighted sum can be changed in real time, or selected based on the operating mode of the vehicle 8.

Referring back to FIG. 7, after calculating and associating an optimization index with each located vehicle performance record, block 160 directs the processor circuit 120 to find or identify the best optimization index. Where the above cost function is used to calculate the optimization index values it is desirable to find the minimum cost to produce the requested power. This may be done by sorting the optimization indices produced by block 156, in ascending order such that the lowest optimization index value is at the top of the list. In this embodiment, the lowest optimization index value is the best one.

Block 162 then directs the processor circuit 120 to locate the vehicle performance record associated with the lowest optimization index value and to extract from that performance record the operating conditions associated therewith from the contents of the torque and angular speed fields 34 and 36 respectively to obtain torque and speed values representing an optimum set of operating conditions at which the generator 7 and prime mover 9, respectively, should be operated to cause the generator to produce the requested power while optimizing the operating characteristics of the vehicle. These torque and speed values are provided to the control signal generator program which directs the processor circuit 120 to cause the output port to produce signals in the form of command files, words, bytes, or bits understandable by the prime mover controller 20 and the generator interface 28 to cause them to operate at the optimum set of operating conditions.

When the prime mover 9 and generator 7 are operated at this optimum set of operating conditions, it is expected that the actual values of the operating characteristics associated with this set of operating conditions will match the raw values, measured during production of the vehicle performance records and thus the operating characteristics of the vehicle will be optimized.

Optionally, additional routines may be provided to determine a succession of operating conditions for a corresponding succession of possible power requests, to minimize the cost of providing the succession of possible power requests.

While specific embodiments of the invention have been described and illustrated, such embodiments should be considered illustrative of the invention only and not as limiting the invention as construed in accordance with the accompanying claims.

What is claimed is:

1. A process for controlling operating conditions of a hybrid electric vehicle to optimize operating characteristics of the vehicle, the process comprising:

locating, from among a plurality of sets of vehicle operating conditions associated with a requested generator power value, an optimal set of operating conditions that optimizes operating characteristics of the vehicle, wherein locating comprises locating a set of vehicle operating characteristics associated with said requested generator power value and locating a vehicle performance record having a field containing said requested generator power value and fields containing values identifying operating conditions under which said requested generator power can be produced and fields containing values identifying operating characteristics of the vehicle when the vehicle is operated at said operating conditions; and producing signals for controlling a prime mover of the vehicle and a generator driven by the prime mover to operate the vehicle at said optimal set of operating conditions, and to cause the generator to supply power at said requested generator power value.

2. The process of claim 1 wherein locating comprises finding an optimal set of operating characteristics, associated with operating conditions associated with said requested power value, that provides a minimal value of a function of said operating characteristics that is less than values produced by other sets of operating characteristics associated with other operating conditions associated with said requested power value.

3. The process of claim 2 wherein locating further comprises applying the operating characteristics of a plurality of different operating conditions associated with said requested power value to said function.

4. The process of claim 3 wherein applying comprises subjecting said operating characteristics to a weighted function.

5. The process of claim 4 further comprising selecting weights used in said function according to operating mode of the vehicle.

6. The process of claim 2 wherein producing comprises producing said signals in response to a set of operating conditions associated with said optimal set of operating characteristics.

7. The process of claim 1 wherein locating comprises calculating an optimization index for each set of vehicle operating characteristics associated with said requested generator power value.

8. The process of claim 7 wherein calculating an optimization index comprises calculating a cost value as a function of a weighted sum of normalized operating characteristic values.

9. The process of claim 8 further comprising selecting weights for use in calculating said weighted sum, in response to an operating mode of the vehicle.

10. The process of claim 7 wherein locating comprises identifying the best optimization index from among the optimization indexes calculated for each set of operating conditions.

11. The process of claim 10 wherein identifying the best optimization index comprises finding the optimization index with the lowest number.

12. The process of claim 10 wherein locating comprises identifying a set of operating conditions associated with vehicle operating characteristics that produced said best optimization index.

13. The process of claim 12 wherein producing said signals comprises producing a speed signal for setting an angular speed of the prime mover and producing a torque signal for setting a torque burden on the generator.

14. The apparatus of claim 1 further comprising a computation device operable to calculate an optimization index for each set of vehicle operating characteristics associated with said requested generator power value.

15. The apparatus of claim 14 wherein said computation device comprises a processor circuit.

16. The apparatus of claim 14 wherein said computation device is operable to calculate a cost value as a function of a weighted sum of normalized operating characteristic values.

17. The apparatus of claim 16 further comprising a selector operable to select weights for use in calculating said weighted sum, in response to an operating mode of the vehicle.

18. The apparatus of claim 17 wherein said selector comprises a processor circuit.

19. The apparatus of claim 14 further comprising an identifier operable to identify the best optimization index from among the optimization indexes calculated for each set of operating conditions.

20. The apparatus of claim 19 wherein said identifier comprises a processor circuit.

21. The apparatus of claim 19 wherein said identifier is operable to find the optimization index with the lowest value.

22. The apparatus of claim 19 further comprising a device operable to identify a set of operating conditions associated with the vehicle operating characteristics that produced said best optimization index.

23. The apparatus of claim 22 wherein said device comprises a processor circuit.

24. The apparatus of claim 22 wherein said control signal generator is operable to produce a speed signal for setting an angular speed of the prime mover and produce a torque signal for setting a torque burden on the generator in response to said set of operating conditions associated with the vehicle operating characteristics that produced said best optimization index.

25. The apparatus of claim 24 wherein said control signal generator comprises a processor circuit.

26. A computer readable medium encoded with codes for directing a processor circuit to execute the method recited in claim 1.

27. A computer data signal encoded with codes for directing a processor circuit to execute the method recited in claim 1.

28. An apparatus for controlling operating conditions of a hybrid electric vehicle to optimize operating characteristics of the vehicle, the apparatus comprising:
a power request processor operable to locate, from among a plurality of sets of vehicle operating conditions associated with a requested generator power value, an optimal set of operating conditions that optimizes operating characteristics of the vehicle,
said processor being configured to locate a set of vehicle operating characteristics associated with said requested generator power value and to locate a vehicle performance record having a field containing said requested generator power value and fields containing values identifying operating conditions under which said requested generator power can be produced and fields containing values identifying operating characteristics of the vehicle when the vehicle is operated at said operating conditions; and
a control signal generator operable to produce signals for controlling a prime mover of the vehicle and a generator driven by the prime mover to operate the vehicle at said optimal set of operating conditions, and to cause said generator to supply power at said requested generator power value.

29. The apparatus of claim 28 wherein said power request processor is operable to locate an optimal set of operating characteristics, associated with operating conditions associated with said requested power value, that provides a minimal value of a function of said operating characteristics that is less than values produced by other sets of operating characteristics associated with other operating conditions associated with said requested power value.

30. The apparatus of claim 29 further comprising a device operable to apply the operating characteristics associated with a plurality of different operating conditions associated with said requested power value to said function.

31. The apparatus of claim 30 wherein said device is operable to apply said operating characteristics to a weighted function.

32. The apparatus of claim 31 further comprising a selector operable to select weights used in said function according to the operating mode of the vehicle.

33. The apparatus of claim 29 wherein said control signal generator is operable to produce said signals in response to a set of operating conditions associated with said optimal set of operating characteristics.

34. The apparatus of claim 28 wherein said request processor comprises a processor circuit.

35. The apparatus of claim 28 further comprising a database interface facilitating communication between said request processor and a database storing said sets of vehicle operating conditions.

36. An apparatus for controlling operating conditions of a hybrid electric vehicle to optimize operating characteristics of the vehicle, the apparatus comprising:
means for locating, from among a plurality of sets of vehicle operating conditions associated with a requested generator power value, an optimal set of operating conditions that optimizes the operating characteristics of the vehicle, said means for locating including means for locating a set of vehicle operating characteristics associated with said requested generator power value and means for locating a vehicle performance record having a field containing said requested power value and fields containing values identifying operating conditions under which said requested generator power can be produced and fields containing values identifying operating characteristics of the vehicle when the vehicle is operated at said operating conditions; and
means for producing signals for controlling a prime mover of the vehicle and a generator to operate the vehicle at said optimal set of operating conditions to supply power at said requested generator power value.

37. A process for controlling operating conditions of a hybrid electric vehicle to optimize operating characteristics of the vehicle, the process comprising:

locating, from among a plurality of sets of vehicle operating conditions associated with a requested generator power value, an optimal set of operating conditions that optimizes operating characteristics of the vehicle, wherein locating comprises locating a set of vehicle operating characteristics associated with said requested generator power value and calculating an optimization index for each set of vehicle operating characteristics associated with said requested generator power value, identifying a best optimization index, identifying a set of operating conditions associated with vehicle operating characteristics that produced said best optimization index; and producing signals for controlling a prime mover of the vehicle and a generator driven by the prime mover to operate the vehicle at said optimal set of operating conditions, and to cause the generator to supply power at said requested generator power value said signals including a speed signal for setting an angular speed of the prime mover and producing a torque signal for setting a torque burden on the generator.

38. A computer readable medium encoded with codes for directing a processor circuit to execute the method recited in claim 37.

39. A computer data signal encoded with codes for directing a processor circuit to execute the method recited in claim 37.

40. An apparatus for controlling operating condition of a hybrid electric vehicle to optimize operating characteristics of the vehicle, the apparatus comprising:

a power request processor configured to locate, from among a plurality of sets of vehicle operating conditions associated with a requested generator power value, an optimal set of operating conditions that optimizes operating characteristics of the vehicle, wherein said power request processor is configured to locate a set of vehicle operating characteristics associated with said requested generator power value, and locate a vehicle performance record having a field containing said requested generator power value and fields containing values identifying operating conditions under which said requested generator power can be produced and fields containing values identifying operating characteristics of the vehicle when the vehicle is operated at said operating conditions and wherein said power request processor is configured to identify a best optimization index and to identify a set of operating conditions associated with the vehicle operating characteristics that produced said best optimization index, and a control signal generator operable to produce signals for controlling a prime mover of the vehicle and a generator driven by the prime mover to operate the vehicle at said optimal set of operating conditions, to cause said generator to supply power at said requested generator power value, said control signal generator being operable to produce a speed signal for setting an angular speed of the prime mover and produce a torque signal for setting a torque burden on the generator in response to said set of operating conditions associated with the vehicle operating characteristics that produced said best optimization index.

41. The apparatus of claim 40 wherein said control signal generator comprises a processor circuit.

* * * * *

UNITED STATES PATENT AND TRADEMARK OFFICE
CERTIFICATE OF CORRECTION

PATENT NO.       : 6,879,054 B2
APPLICATION NO.  : 10/097297
DATED            : March 15, 2002
INVENTOR(S)      : Robert Michael Gosselin Page 1 of 1

It is certified that error appears in the above-identified patent and that said Letters Patent is hereby corrected as shown below:

Column 15, Line 12, the portion of claim 14 reading "The apparatus of claim 1" should read --The apparatus of claim 28--.

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 6,879,054 B2  Page 1 of 1
APPLICATION NO. : 10/097297
DATED : April 12, 2005
INVENTOR(S) : Robert Michael Gosselin It is certified that error appears in the above-identified patent and that said Letters Patent is hereby corrected as shown below:

Column 15, Line 12, the portion of claim 14 reading "The apparatus of claim 1" should read --The apparatus of claim 28--.

This certificate supersedes the Certificate of Correction issued September 23, 2008.

Signed and Sealed this

Fourteenth Day of October, 2008

JON W. DUDAS
*Director of the United States Patent and Trademark Office*